United States Patent [19]

Boehmer

[11] Patent Number: 4,951,701

[45] Date of Patent: Aug. 28, 1990

[54] COMBINATION AIR VENT AND OVERPRESSURE VALVE

[75] Inventor: Dennis A. Boehmer, Xenia, Ohio

[73] Assignee: Vernay Laboratories, Inc., Yellow Springs, Ohio

[21] Appl. No.: 380,237

[22] Filed: Jul. 17, 1989

[51] Int. Cl.[5] .............................................. F16K 17/04

[52] U.S. Cl. .................................... 137/199; 137/202; 137/493.9

[58] Field of Search ..................... 137/202, 199, 493.9; 251/333

[56] References Cited

U.S. PATENT DOCUMENTS

| | | | |
|---|---|---|---|
| 2,605,779 | 8/1952 | Smithisler | 137/73 |
| 2,677,939 | 5/1954 | Clute | 137/202 X |
| 2,729,228 | 1/1956 | Stevenson | 137/199 |
| 3,867,071 | 2/1975 | Hartley | 417/211.3 |
| 4,062,384 | 12/1977 | Frahm et al. | 141/146 |
| 4,325,398 | 4/1982 | Green | 137/39 |
| 4,342,329 | 8/1982 | Roff | 137/202 |
| 4,372,353 | 2/1983 | Weas | 141/206 |
| 4,388,047 | 6/1983 | Mizuno et al. | 417/299 |
| 4,457,325 | 7/1984 | Green | 137/39 |
| 4,487,215 | 12/1984 | Green | 137/202 X |
| 4,785,484 | 11/1988 | Sargent | 137/202 X |

*Primary Examiner*—Alan Cohan
*Attorney, Agent, or Firm*—Biebel, French & Nauman

[57] ABSTRACT

A combined air vent and overpressure relief valve for a submersible pump includes a single tubular housing to be inserted in an opening in the upper end wall of a chamber on the outlet pressure side of the pump. The upper end of this housing has a vent hole therethrough, and inside the housing is an annular valve seat facing upwardly. A valve disk within the housing is proportioned to move lengthwise thereof toward and away from the valve seat but is normally biased into sealing engagement with the seat by a spring within the housing. This valve disk has a bleed hole therethrough, and a valve ball is caged in the lower part of the housing, below the valve seat for movement into and out of sealing engagement with the lower end of the bleed hole in the valve disk as the pressure within the chamber rises and falls. If that pressure exceeds the force of the spring holding the valve disk closed, the disk will be forced out of sealing engagement with its seat in the housing, thereby providing a flow path for liquid around the periphery of the disk to and through the vent hole in the upper end wall of the housing.

5 Claims, 2 Drawing Sheets

COMBINATION AIR VENT AND OVERPRESSURE VALVE

BACKGROUND OF THE INVENTION

This invention is directed to providing a combined air vent and overpressure relief valve assembly for installation in an opening in the upper end wall of a chamber which in use will be filled with liquid under pressure, such particularly as the interior of a submersible fuel pump of the type which is commonly located in the fuel tank of a motor vehicle.

A problem indigenous with submersible pumps is that some provision is needed for purging air from the interior of the pump, and also a provision for relieving pressure in the pump if, for example, the pump outlet or some point downstream therefrom should be partially or completely blocked. The first of these needs results from the fact that when air accumulates in a submersible pump of this type, the pump may be incapable of generating sufficient pressure to force the air out through the check valve which is normally present in the output line from the pump.

This initial need can be taken care of by a check valve operating in the reverse direction which will allow air to escape but will be closed by the hydraulic pressure as soon as the air has been evacuated. There still remains, however, the other problem of excess pressure, and this has been taken care of in the past by the provision of a third check valve which will open for release of liquid from the chamber in response to hydraulic pressure substantially higher than is needed to close the air vent valve.

SUMMARY OF THE INVENTION

The present invention provides a combined air vent and overpressure relief valve in a single assembly for installation in an opening in the upper end wall of a chamber, such as the housing of a submersible pump or housing for valve components, from which it is necessary to vent accumulated air or fuel vapor at ambient or low pressure and also to relieve excess hydraulic pressure. A special characteristic of the assembly of the invention is that some of its component parts contribute to the functions of both air venting and relief of overpressure.

More specifically, the assembly of the invention includes a single tubular housing which is inserted in an opening in the upper end wall of a chamber to be filled with liquid under pressure, and the upper end wall of this housing is provided with a vent hole therethrough. Inside the housing is an annular valve seat facing the upper end wall of the housing, and a valve disk within the housing is proportioned to move lengthwise of the housing toward and away from the valve seat but is normally biased into sealing engagement with the seat by a spring within the housing.

This valve disk also has a bleed hole therethrough, and a valve ball is caged in the lower part of the housing, below the valve seat, for movement into and out of sealing engagement with the lower end of the bleed hole in the valve disk. In addition, the lower end construction of the housing is such as to expose enough of the lower surface of the valve disk directly to the hydraulic pressure within the chamber so that if that pressure exceeds the force of the compression spring holding the valve disk closed, the disk will be forced out of sealing engagement with its seat in the housing, thereby providing a flow path for liquid around the periphery of the disk to and through the vent hole in the upper end wall of the housing.

The primary object of the invention is to provide a combined air vent and overpressure relief valve in a single assembly as outlined above. Other objects and advantages, and specific means by which the invention achieves and provides them, will be apparent from or pointed out in the course of the description of the preferred embodiment hereinafter.

BRIEF DESCRIPTION OF THE PREFERRED EMBODIMENT

Figure 5:
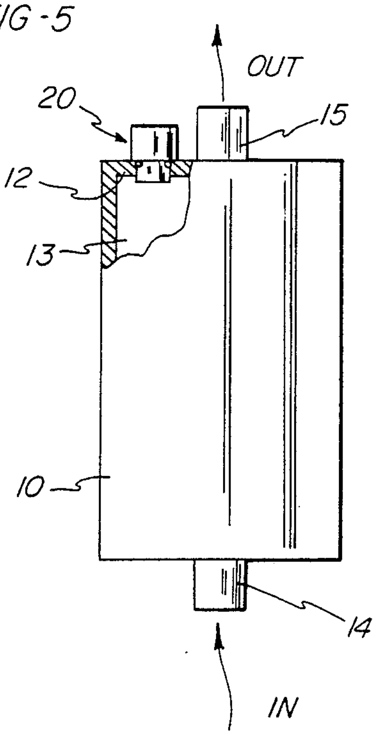
FIG. 5 is a simplified diagrammatic view illustrating a typical installation of the assembly shown in FIGS. 1–4.

The part 10 shown in FIG. 5 represents the housing of a submersible pump such as is commonly installed in the fuel tank of an automobile. For the purposes of the invention, the identity of the operating parts within the housing 10 is not material, and it is significant only that the housing 10 has an opening 11 through the upper end wall 12 thereof into a chamber 13 on the output side of the pump.

The housing 10 is also provided with an inlet port 14 for liquid to be pumped, and an outlet port 15, which normally incorporates a check valve that is held open by the output pressure of the pump and therefore closes when the pump is not operating. The direct concern of the invention is that when the pump is not operating, air tends to accumulate in the top of chamber 13, and when the pump starts its next operating cycle, the accumulated air acts as a cushion which prevents the pump from developing sufficient output pressure to open the check valve in its output line.

Figure 1:
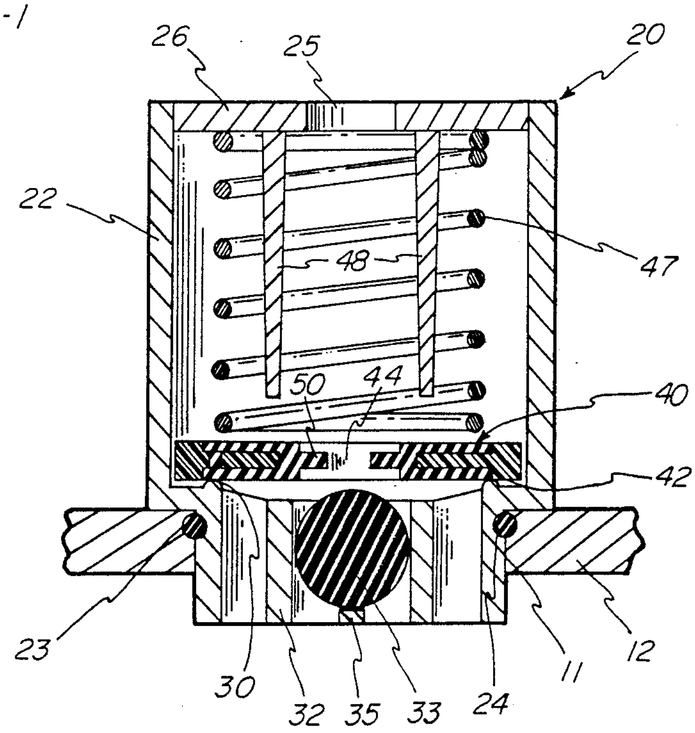
FIG. 1 is a view in axial section of a combined air vent and overpressure relief valve assembly in accordance with the invention installed in an opening in the housing of a submersible pump and with the movable parts in the positions which they normally occupy when the pump is not operating.

The invention accordingly provides an assembly 20 which is installed in sealed relation within the opening 11 in the top wall 12 of pump housing 10. This assembly includes, as seen in FIG. 1, a cylindrical housing 22 proportioned to be press fitted in the opening 11, preferably with the aid of an 0-ring 23 in a groove 24 encircling the housing which effects a tight seal in the opening 11. A permanently open vent hole 25 of substantial flow area is provided in the upper end wall 26 of housing 22.

Figure 4:
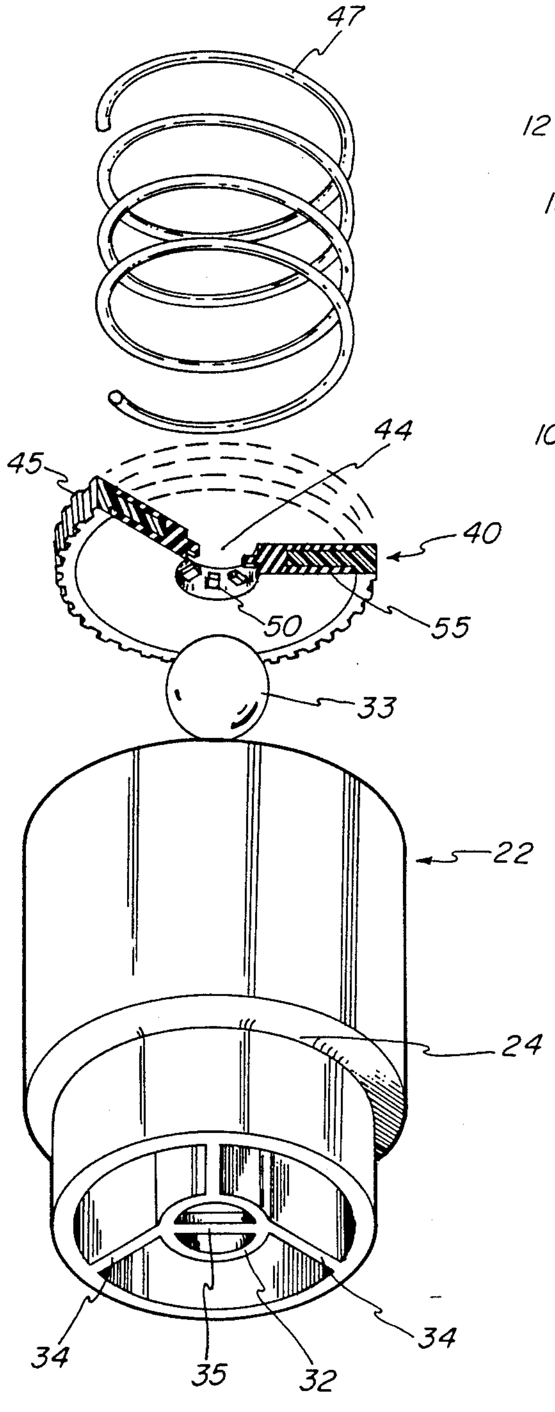
FIG. 4 is an exploded perspective view of the assembly shown in FIGS. 1–3.

Near its inner end, the housing 22 is formed to provide an annular valve seat 30 facing the upper end wall 26. Otherwise, the lower end of the housing is open except for a guide or cage 32 for a valve ball 33, so that there is a passage extending from end to end through the housing 22. The cage 32 is tubular, and it may be frustoconical or otherwise configured to retain the ball 33 inside the housing 22. For example, as best shown in FIG. 4, if the housing 22 is molded of thermoplastic material, the cage 32 may be integrally formed therewith to include radially extending webs 34, which support cage 32 in the housing, and a bar 35 across its lower end which serves to retain ball 33 in its cage.

Inside the housing 22 there is a valve disk 40 proportioned to move lengthwise of the housing. It includes an annular portion 42 (FIGS. 1-3) proportioned for sealing engagement with the valve seat 30, and also a centrally located bleed hole 44, the lower periphery of which constitutes a seat for the valve ball 33. In addition, the outer periphery of valve disk 40 is notched or otherwise configured, as indicated at 45 in FIG. 4, to provide an annular flow passage 46 between this disk and the inner surface of housing 22 for the passage of fluid when the disk is out of sealing engagement with its seat 30. The flow area of annular passage 46 should be less than that of vent 25.

A compression spring 47 within housing 22 provides a constant biasing force urging the valve disk 40 into sealing engagement with valve seat 30. As described hereinafter, the valve disk 40 can move against spring 46 when the hydraulic pressure within the pump housing is sufficient to overcome that spring, but such movement is limited by projections 48, such as studs or the like, which depend from the housing upper end wall 26.

Preferably, the length of these projections should be such that when the valve disk 40 has moved into contact with their lower ends, the space between the bottom face of disk 40 and the upper end of the ball cage 32 will be less than the diameter of valve ball 33. In this manner, the ball is at all times retained within cage 32, and the fluid flow past the ball will be sufficient to bypass excess pressure while still holding valve disk 40 in contact with projections 48 to preclude disk 40 from fluttering or otherwise generating noise.

FIG. 1 illustrates the relative positions of the movable parts during a time interval when the pump within housing 10 is not operating. During such an interval, air or other gas under ambient pressure will accumulate in the top portion of the interior of chamber 13. Since the top of cage 32 is below the level of valve seat 30, this air can flow through the space between cage 32 and valve disk 40.

Figure 2:
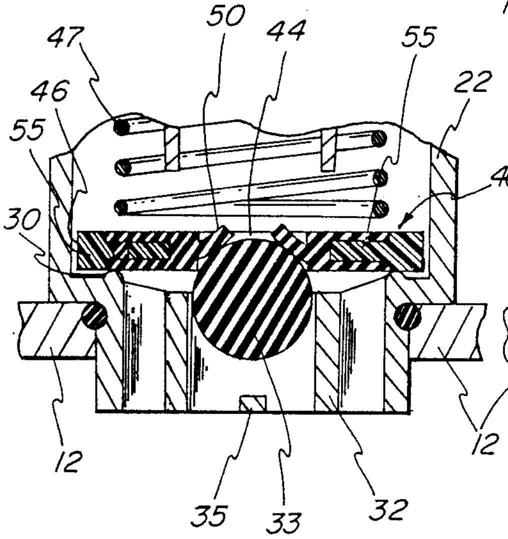
FIG. 2 is a view similar to FIG. 1 showing the movable parts in the positions which they occupy while the pump is operating at normal pressure.

When the pump next starts to operate, its first action will be to attempt to fill chamber 13 with liquid, and during this initial stage of operation, as the amount of liquid inside chamber 13 increases, it will force the accumulated air to flow out over the top of the ball cage 32 to the bleed hole 44 and thence to the vent hole 25. As soon as all the accumulated air has thus been vented, the liquid flow will carry the valve ball 33 into sealing engagement with the lower end of bleed hole 44, as shown in FIG. 2, and the pump can then continue to operate normally unless and until an overpressure condition develops.

Figure 3:
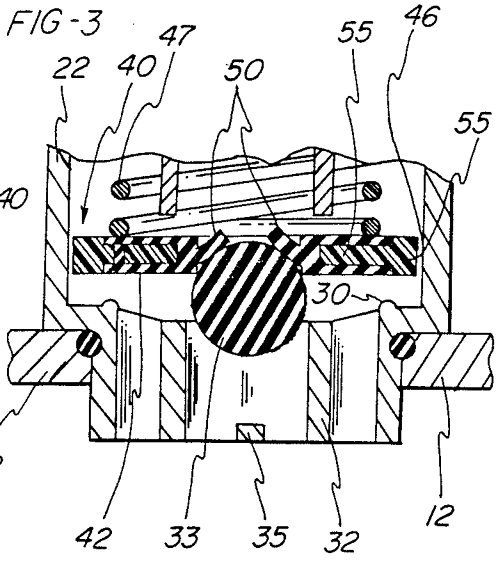
FIG. 3 is a view similar to FIG. 1 showing the positions which the movable parts occupy during the relief of an overpressure condition.

'Whenever that condition does occur, and the hydraulic pressure has developed to a sufficient extent to overcome the biasing force of spring 47, it will force valve disk 40 upwardly away from valve seat 30, as illustrated in FIG. 3. With the movable parts in those positions, although the valve ball 33 will still hold the bleed hole 44 closed, liquid can flow around the periphery of the valve disk 40 into the upper part of housing 22 and thence out through the vent hole 25 As soon as the overpressure condition has been corrected, the spring 47 will return the movable parts to the positions shown in FIG. 2 for continued normal operation.

It will be apparent that since the purpose of the bleed hole 44 and valve ball 33 is to provide for the venting of accumulated air or other gas with minimum leakage of liquid, the weight and specific gravity of the valve ball should be selected so that the ball will seat on the bleed hole 44 in response to the development of relatively low pressure within the container 10, e.g. 10 psi. For example, the valve ball 33 may be of molded fluorocarbon rubber with a diameter of $\frac{1}{8}$ inch.

The bleed hole 44 should be of correspondingly smaller diameter, e.g. 0.80 inch, and it is also desirable to provide a series of fingers or equivalent protrusions 50 spaced around the interior of hole 44, as shown in FIG. 4, which prevent the valve ball 33 from closing hole 44 unless the fluid pressure is sufficient to deform the ball and/or the fingers 50 until the ball is in sealing relation with the periphery of the hole. For optimum results, the valve disk 40 could be formed of a suitable elastomer molded around a flat plastic ring 55, with the fingers 50 being of the elastomeric material. Alternatively, the portion of the disk 40 around hole 44, which defines the seat for valve ball 35, may be molded with a rough finish that will provide for a bleed flow of fluid past the ball 35 as may be needed under the normal operating conditions illustrated in FIGS. 2.

The compression spring 46 should be selected to provide a biasing force on the valve disk 40 which is substantially higher than the force required to open the conventional check valve in the supply line 15 from the pump. For example, if the latter valve opens at a differential pressure of positive 5 psi, the spring 46 should hold the valve disk 40 closed up to a positive pressure in the range of 90 to 110 psi. These values, and the dimensions of the component parts, are not critical, but the invention provides important practical advantages in that the entire assembly can be retained within overall limits of 0.625 inch long and 0.350 inch in diameter.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. A combined air vent and overpressure relief valve assembly for installation in an opening in the upper end wall of a chamber to be filled with liquid under pressure, comprising:

(a) a tubular housing proportioned for insertion in said opening in sealed relation with said wall, (b) said housing having an upper end wall provided with a vent hole therethrough, (c) means within said housing forming an annular valve seat facing said upper end wall, (d) a valve disk within and proportioned to move lengthwise of said housing and including an annular portion proportioned for sealing engagement with said valve seat, (e) means for maintaining said valve disk out of sealing engagement with the inner surface of said housing to provide for flow of liquid past the periphery of said valve disk when said disk is out of engagement with said seat, (f) spring means in said housing for biasing said disk into sealing engagement with said seat, (g) said valve disk having a bleed hole therethrough, (h) a valve ball proportioned to seat in the lower end of and close said bleed hole, (i) a guide cage for said ball fixed in the lower end of said housing for retaining said ball in aligned relation with said bleed hole, (j) said cage being proportioned both to provide for travel of said valve ball into and out of sealing relation with said bleed hole while said valve disk is in said sealing engagement with said valve seat and to provide space for flow of fluid from within said chamber to said bleed hole when said valve ball is out of sealing engagement with said bleed hole, (k) said cage being open at the lower end thereof to expose said ball and the lower surface of said disk to fluid under pressure from said chamber, and (l) said ball and said valve disk constituting the sole members of said valve assembly which are movable with respect to said housing whereby following movement of said ball into seated and closing relation with said bleed hole, said valve and said disk are movable as a unit in response to pressure on the undersurface of said disk of sufficient magnitude to overcome said spring means.

2. An assembly as defined in claim 1 wherein said spring means is a compression spring positioned between said housing end wall and said disk, and further comprising means in said housing limiting travel of said valve disk away from said valve seat to a maximum distance substantially less than the diameter of said valve ball to cause said ball to be retained in said cage in all positions of said valve disk.

3. An assembly as defined in claim 1, 4 or 5 wherein said valve ball is formed of elastomeric material, and further comprising fingers of elastomeric material spaced around the interior of said bleed hole for holding said ball out of sealing engagement with said bleed hole until the pressure within said chamber exceeds a predetermined value.

4. A combined air vent and overpressure relief valve assembly for installation in an opening in the upper end wall of a chamber to be filled with liquid under pressure, comprising:

(a) a housing proportioned for insertion vertically in said opening in sealed relation with said wall, (b) means defining a passage extending vertically through said housing and having an inlet opening at the lower end thereof and a vent hole at the upper end thereof, (c) means in said passage forming an annular valve seat adjacent the lower end of said passage and facing said vent hole, (d) a valve member within and proportioned to move lengthwise of said passage above said valve seat and including an annular portion proportioned for sealing engagement with said valve seat, (e) means maintaining said valve member out of sealing engagement with the surrounding wall of said passage to provide for flow of fluid past the periphery of said valve member when said annular portion thereof is out of engagement with said seat, (f) spring means in said passage for biasing said valve member into sealing engagement of said annular portion thereof with said seat, (g) said valve member having a bleed hole therethrough, (h) a valve ball proportioned to move freely in the lower portion of said passage into and out of seated sealing relation with the lower end of said bleed hole, (i) said housing including means retaining said ball between the lower end of said passage and said valve member while providing for downward movement of said ball out of seated relation with said bleed hole, (j) whereby air in said chamber will flow around said ball to said bleed hole, and liquid pressure in said chamber will first move said ball into sealing relation with said bleed hole and will thereafter move said valve member upwardly from said seat while retaining said ball seated on said bleed hole and will escape around said valve member to the upper end of said passage and said vent hole, and (k) said ball and said valve disk constituting the sole members of said valve assembly which are movable with respect to said housing whereby following movement of said ball into seated and closing relation with said bleed hole, said valve and said disk are movable as a unit in response to pressure on the undersurface of said disk of sufficient magnitude to overcome said spring means.

5. A combined air vent and overpressure relief valve assembly for installation in an opening in the upper end wall of a chamber to be filled with liquid under pressure, said chamber having an outlet controlled by a check valve which opens in response to development of a predetermined pressure in said chamber, comprising:

(a) a housing proportioned for insertion vertically in said opening in sealed relation with said wall, (b) means defining a passage extending vertically through said housing and having an inlet opening at the lower end thereof and a vent hole at the upper end thereof, (c) means in said passage forming an annular valve seat adjacent the lower end of said passage and facing said vent hole, (d) a valve member within and proportioned to move lengthwise of said passage above said valve seat and including an annular portion proportioned for sealing engagement with said valve seat, (e) means maintaining said valve member out of sealing engagement with the surrounding wall of said passage to provide for flow of fluid past the periphery of said valve member when said annular portion thereof is out of engagement with said seat, (f) spring means in said passage for biasing said valve member into sealing engagement of said annular portion thereof with said seat, (g) said valve member having a bleed hole therethrough, (h) a valve ball proportioned to move freely in the lower portion of said passage into and out of seated sealing relation with the lower end of said bleed hole, (i) said housing including means retaining said ball between the lower end of said passage and said valve member while providing for downward movement of said ball out of seated relation with said bleed hole, (j) whereby air in said chamber will flow around said ball to said bleed hole, and liquid pressure in said chamber will move said ball into sealing relation with said bleed hole, and (k) said spring means being of predetermined strength holding said valve member in sealing engagement with said seat until the pressure in said chamber exceeds by a predetermined margin said predetermined pressure under which said check valve opens and causes said valve member to move upwardly from said seat while retaining said ball seated on said bleed hole.

* * * * *